United States Patent
Boudouris et al.

[15] 3,684,144
[45] Aug. 15, 1972

[54] FILM TENSIONING DEVICE FOR MOTION PICTURE PROJECTORS

[72] Inventors: Angelo Boudouris, Sylvania, Ohio; Geofrey T. Gray, Lambertville, Mich.

[73] Assignee: Eprad Incorporated, Toledo, Ohio

[22] Filed: Nov. 2, 1970

[21] Appl. No.: 86,023

[52] U.S. Cl. .................................226/114, 226/195
[51] Int. Cl. ...........................................B65h 17/42
[58] Field of Search......................226/114, 113, 195

[56] References Cited

UNITED STATES PATENTS

| | | | |
|---|---|---|---|
| 1,933,336 | 10/1933 | Peterman | 226/113 X |
| 1,978,073 | 10/1934 | Belcher | 226/195 X |
| 2,100,802 | 11/1937 | Hansen | 226/195 X |

Primary Examiner—Richard A. Schacher
Attorney—Owen & Owen

[57] ABSTRACT

A device for tensioning motion picture film against a rotating drum to reduce audio distortion caused by fluctuations in film speed. A curved bar is pivotally mounted at its center with ends positioned on opposite sides of the drum. Guide rolls are attached to the ends of the bar with each guide roll rotating about an axis parallel to the axis about which the drum rotates. A substantially constant length of film extends from a driven sprocket, around one guide roll, the drum and the other guide roll, and over a second driven sprocket. The pivot to which the bar is mounted is biased to tension the film against the drum. Small fluctuations in the length of film between the two sprockets are dampened by fluctuations in the position of the bar and the guide rolls and by the inertia of the drum.

5 Claims, 4 Drawing Figures

INVENTORS:
ANGELO BOUDOURIS,
GEOFFREY T. GRAY
BY
ATT'YS.

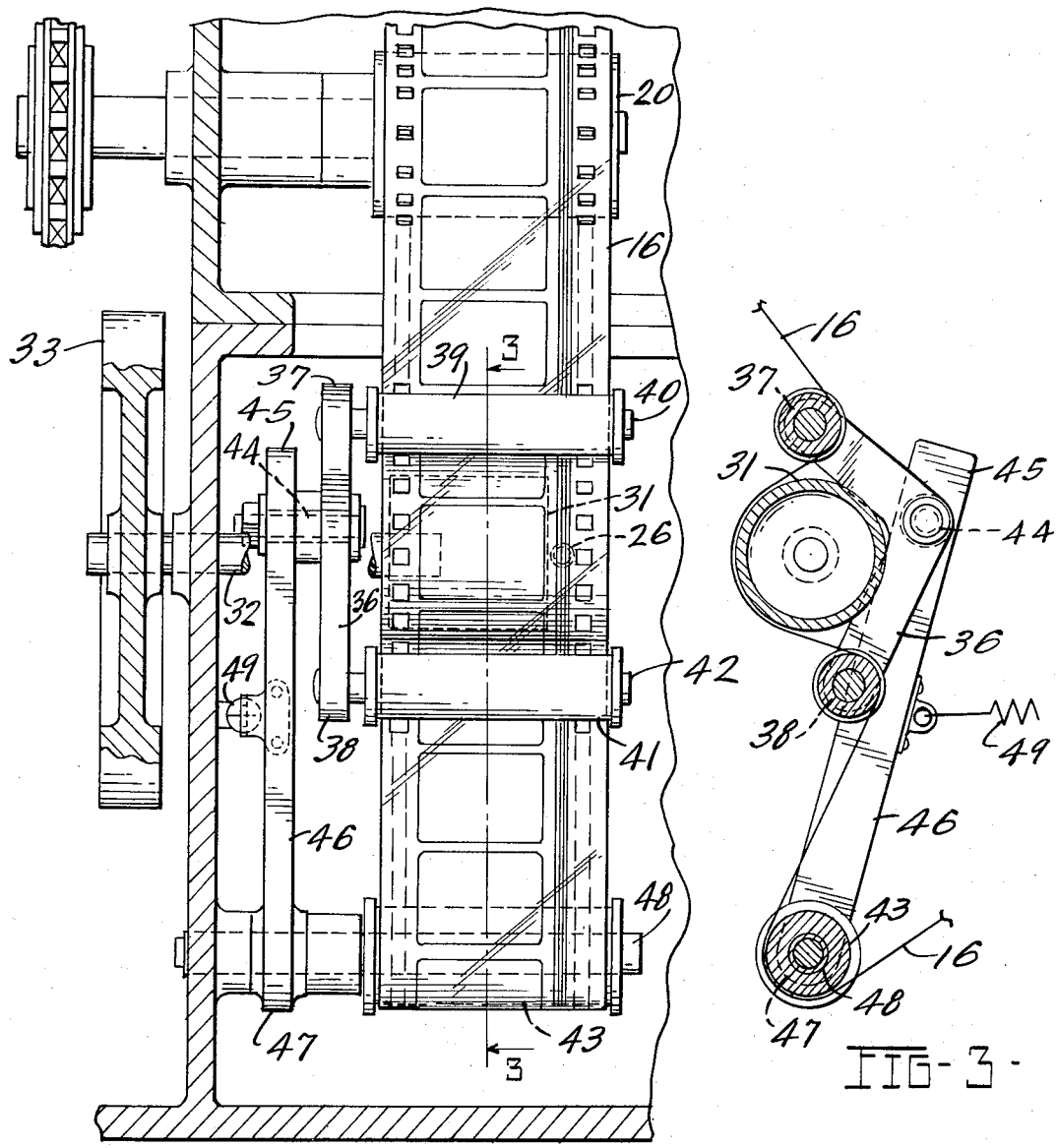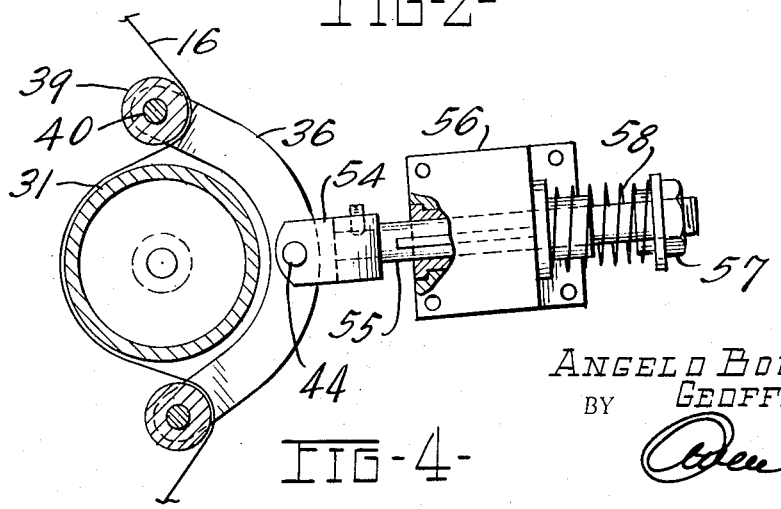

FILM TENSIONING DEVICE FOR MOTION PICTURE PROJECTORS

BACKGROUND OF THE INVENTION

This invention relates to motion picture projectors and more particularly to a a device for tensioning motion picture film against a drum to reduce distortion in an audio signal produced from the sound track on the film.

Motion picture projectors generally comprise a film transport, a light source, a shutter mechanism, a lens system and an audio or sound reproducing system. The film is intermittently driven past the shutter mechanism. Each time the film stops, the shutter mechanism opens momentarily one or more times to project a single film frame onto a screen. The film is then driven past a photoelectric detector which produces an audio signal from a sound track on the film.

Flutter, wow and similar distortions are often present in the audio signal because of small fluctuations in the film speed as it passes the photoelectric detector. In the past, fluctuations in film speed have been dampened through the use of an impedance or inertia drum. The drum is generally positioned adjacent the photoelectric detector and mounted to rotate with a relatively massive flywheel. The film is passed over the drum to cause the drum to rotate at a constant speed. The inertia of the flywheel and the drum resists fluctuations in the speed of the film as it passes over the drum. An expensive and complicated system of guide rolls has been used to tension the film against the drum. Each guide roll is commonly spring loaded and one or both may be provided with a pneumatic or oil-filled damper or dashpot to absorb small fluctuations in the film speed. Because of the expense and the complicated apparatus required, this method of mounting guide rolls to tension film has not been altogether satisfactory.

SUMMARY OF THE INVENTION

According to the present invention, an improved device is provided for tensioning film against a drum to reduce distortion in an audio signal generated from the sound track of the film. The tensioning device generally comprises a curved bar which is mounted adjacent its center to a pivot. Guide rolls are attached to the ends of the bar such that the guide rolls are positioned on opposite sides of the drum and rotate about axes parallel to the axis on which the drum rotates. A substantially constant length of film passes from a constant speed sprocket over one guide roll, around at least a portion of the drum, over the second guide roll, and around a second constant speed sprocket. A spring or counter weight urges the pivot to which the curved bar is attached in a direction to tension the film against the drum. Small fluctuations in the speed of the film and in the length of the film extending between the two constant speed sprockets are dampened by the inertia of the drum, by the bar on which the guide rolls are mounted pivoting and by the pivot point and the bar moving toward and away from the drum.

Accordingly, it is a preferred embodiment of the invention to provide an inexpensive device for tensioning film on a drum having substantial inertia to reduce distortion in the audio signal generated from the sound track of the film.

Another object of the invention is to provide an improved device for tensioning film in a motion picture projector.

Other objects and advantages of the invention will become apparent from the following detailed description, with reference being made to the accompanying drawings.

BRIEF DESCRIPTION OF THE DRAWINGS

FIG. 2 is a cross-sectional view taken along line 2—2 of FIG. 1;

FIG. 3 is a cross-sectional view of the film tensioning device taken along line 3—3 of FIG. 2; and FIG. 4 is a side elevational view of a modified embodiment of the film tensioning device of the present invention.

DESCRIPTION OF THE PREFERRED EMBODIMENTS

Figure 1:
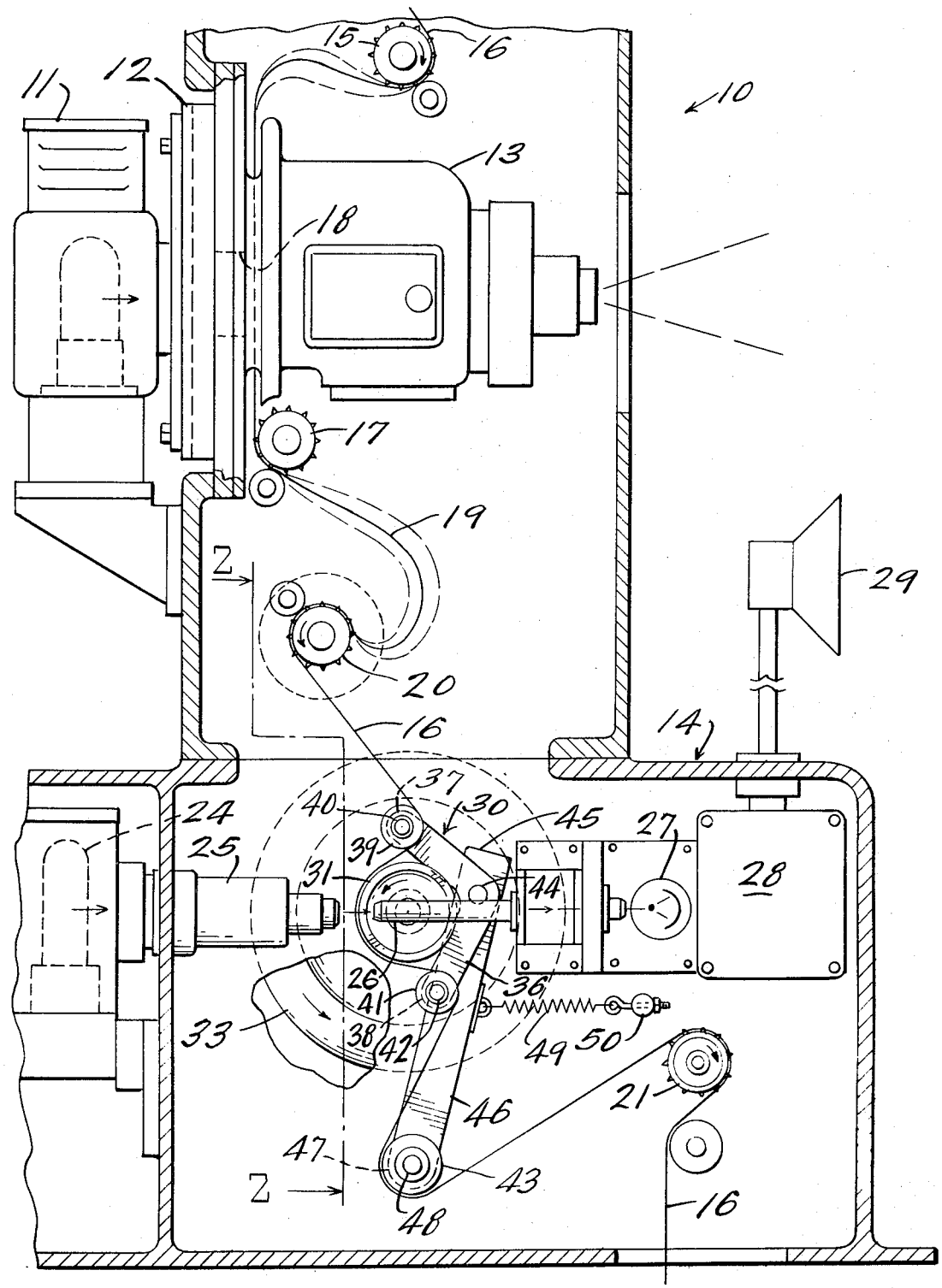
FIG. 1 is a side elevational view, in partial section, of a portion of a motion picture projector incorporating a film tensioning device in accordance with the present invention.

Referring to FIG. 1, a portion of a motion picture projector 10 is shown in section. The projector 10 generally comprises a light source 11 including a shutter mechanism 12, a lens housing 13 including suitable projection lenses and a focusing mechanism (not shown), an audio system 14, and a film drive mechanism.

The film drive mechanism includes a number of sprockets which are driven from a motor (not shown). A sprocket 15 is driven at a constant speed to pull a continuous strip of film 16 from a supply reel (not shown). A sprocket 17 is intermittently driven, for example, by a Geneva mechanism, to pull the film past a gate 18. The gate 18 is located between the light source 11 and the lens housing 13. Each time the sprocket 17 stops, the shutter mechanism 12 opens to project a picture frame onto a screen. From the sprocket 17, the film 16 passes through a loop 19, over a constant speed sprocket 20, through the audio system 14, over a constant speed sprocket 21 and is collected on a take-up reel (not shown).

The audio system 14 may comprise any conventional apparatus for reproducing speech from a sound track on the film 16. As shown in FIG. 1, light emitting from a lamp 24 passes through an optical collimator and lens 25 where it is directed toward the sound track on the film 16. A varying amount of light passes through the sound track on the film 16, down a light guide 26 and is sensed by a photocell detector 27. The detector 27 produces a continuous electrical output signal corresponding to the signal recorded on the sound track on the film 16. The electrical output signal is then amplified by an amplifier 28 and the audio signal is reproduced by a speaker 29.

Turning now to FIGS. 1–3, a film tensioning device 30 is shown in accordance with the present invention. The film tensioning device 30 functions in cooperation with a drum 31 for reducing minor fluctuations in the speed of the film 16 as it passes between the light collimator and lens 25 and the light guide 26. The drum 31 is attached to one end of an axle 32 which is mounted to rotate freely on suitable bearings (not shown). A relatively massive flywheel 33 is attached to the other end of the axle 32. When the film 16 is tensioned against the drum 31 and is moved, friction between the moving film 16 and the drum 31 causes the drum 31 to rotate. While the drum 31 is rotating, the inertia of the flywheel 33 and the drum 31 tends to maintain the speed of the drum 31 constant, thereby resisting or dampening fluctuations in the speed of the film 16.

The film tensioning device 30 generally comprises a curved or bent bar 36 having ends 37 and 38 positioned on opposite sides of the drum 31. A guide roll 39 is mounted to rotate on an axle 40 which is attached to the end 37 of the bar 36. Similarly, a guide roll 41 is mounted to rotate on an axle 42 which is attached to the end 38 of the bar 36. The axles 40 and 42 are mounted on the bar 36 such that they are parallel to the axle 32 for the drum 31.

The film 16 extends from the sprocket 20 over the guide roll 39, the drum 31 and the guide roll 41. From the guide roll 41, the film extends over an additional guide roll 43 to the driven sprocket 21. The guide roll 43 is positioned to assure that the film 16 enters and leaves the guide rolls 39 and 41 from opposite sides of the drum 31. If the projector 10 is designed with the take-up reel directly below the drum 31, the guide roll 43 may be eliminated.

The bar 36 is attached to a pivot 44 so that the force exerted by the film 16 will center the guide rolls 39 and 41 on opposite sides of the drum 31. The pivot 44 is mounted on the free end 45 of a lever arm 46. The other end 47 of the lever arm 46 is attached to a fixed pivot 48. A spring 49 is mounted to pivot the lever arm 46 to a position where the film 16 is tensioned against the drum 31. The tensioning force exerted on the film 16 is controlled by an adjustment nut 50 which sets the force exerted by the spring 49. In a modified embodiment, the spring 49 can be replaced with an adjustable counterweight (not shown).

If, for example, one of the driven sprockets 20 or 21 is bent slightly, the length of film between the sprockets 20 and 21 will rapidly fluctuate as the sprockets rotate. As the film length varies, the lever arm 46 will fluctuate or move against the spring 49 to adjust for the varying film length. As the lever arm 46 moves, the force exerted between the film 16 and the drum 31 remains substantially constant and the speed of the film passing between the lamp 24 and the light guide 26 remains substantially constant, thereby reducing distortion such as flutter and wow in the audio signal.

Other arrangements may be provided for mounting the bar 36 to provide a force for tensioning the film 16 against the drum 31. A second embodiment of the invention having a different mount is shown in FIG. 4. The bar 36 is attached by means of the pivot pin 44 to a U-shaped bracket 54. The bracket 54 is attached to a shaft 55 which is mounted to slide in a guide 56. The shaft 55 may be keyed to restrict rotational movement in the guide 56. Although keying the shaft 55 to the guide 56 facilitates placing the film in the projector, it is not required because the film 16 will maintain the guide rolls 39 parallel to the drum 31. A nut 57 is threaded onto the free end of the shaft 55 to compress a spring 58 against the guide 56. The spring 58 urges the bracket 54 toward the guide 56, causing the guide rolls 39 and 41 to tension the film 16 against the drum 31 in a manner similar to that described above for FIGS. 1-3.

It will be appreciated that various modifications and changes may be made in the film tensioning device, and in particular in the method of mounting and of providing a tensioning force in the bar 36 without departing from the spirit and the scope of the appended claims.

What we claims is:

1. A device for tensioning motion picture film against a rotatable drum to reduce fluctuations in the speed of the film comprising, in combination, a pair of guide rolls, means rotatably mounting said guide rolls on opposite sides of the drum including a bar extending between opposite sides of the drum, a pair of pins on which said pair of guide rolls rotate and means attaching said pins to said bar on opposite sides of the drum with said pins parallel to the axis on which the drum rotates, the film passing over one guide roll, the drum and the other guide roll, and means for urging said guide roll mounting means in a direction to tension the film against the drum.

2. A device for tensioning motion picture film against a rotatable drum, as defined in claim 1, wherein said means for urging said guide roll mounting means comprises a lever arm having one end attached to a pivot, means pivotally attaching said bar to said lever arm, and bias means mounted to pivot said lever arm to urge said bar in a direction where said guide rolls tension the film against the drum.

3. A device for tensioning motion picture film against a rotatable drum, as defined in claim 1, wherein said means for urging said guide roll mounting means comprises a guide, a shaft having two ends, said shaft being mounted to slide in said guide, means pivotally attaching said bar to one end of said shaft, a spring, and means compressing said spring between said guide and the other end of said shaft whereby said shaft and said bar are urged in a direction wherein said guide rolls tension the film against the drum.

4. A device for tensioning motion picture film against a rotatable drum, as defined in claim 3, wherein said compressing means includes an adjustable nut threadably engaging said other end of said shaft whereby adjustment of said nut changes the tensioning force exerted on the film by said guide rolls.

5. A device for tensioning motion picture film against a rotatable drum, as defined in a claim 3, and including means for limiting rotational movement of said shaft in said guide.

* * * * *